Patented July 26, 1938

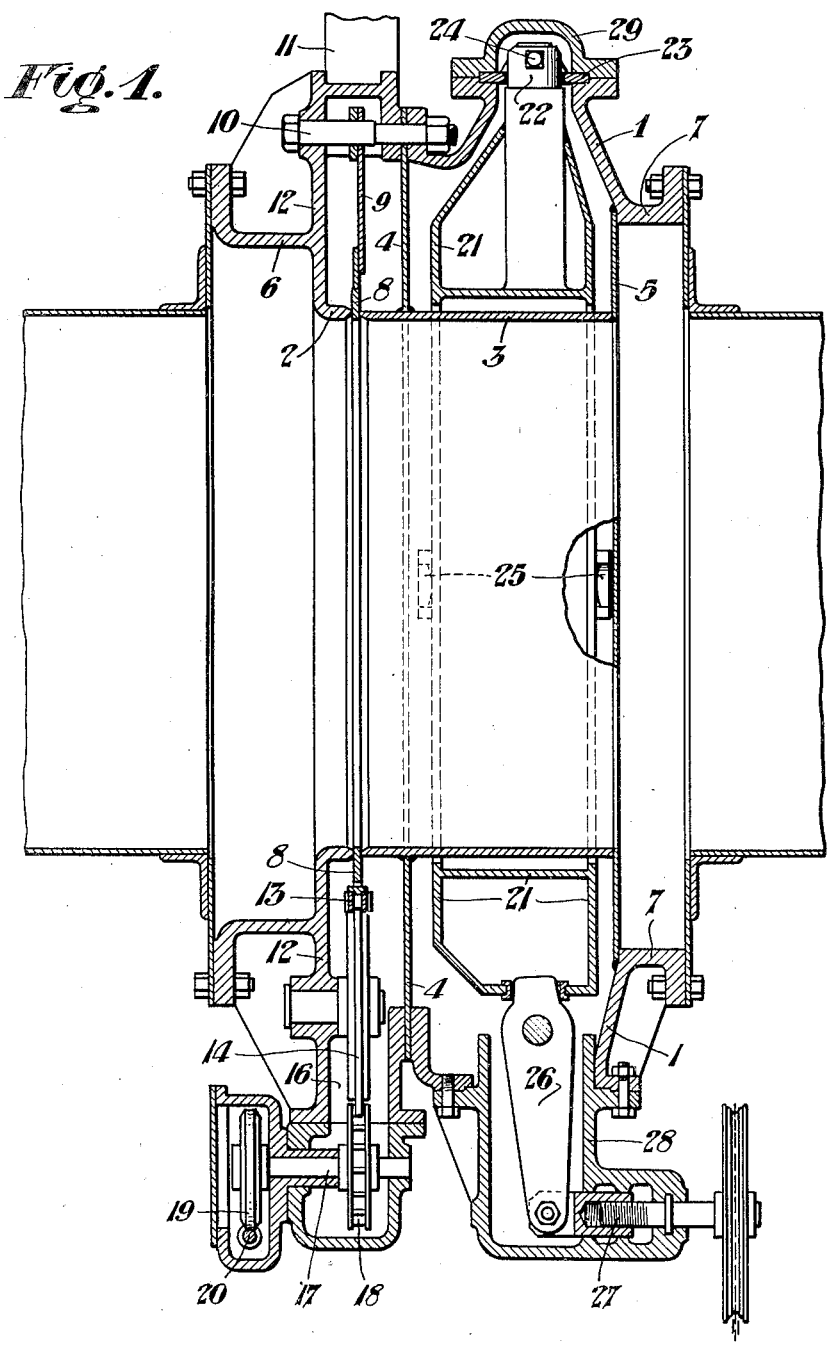

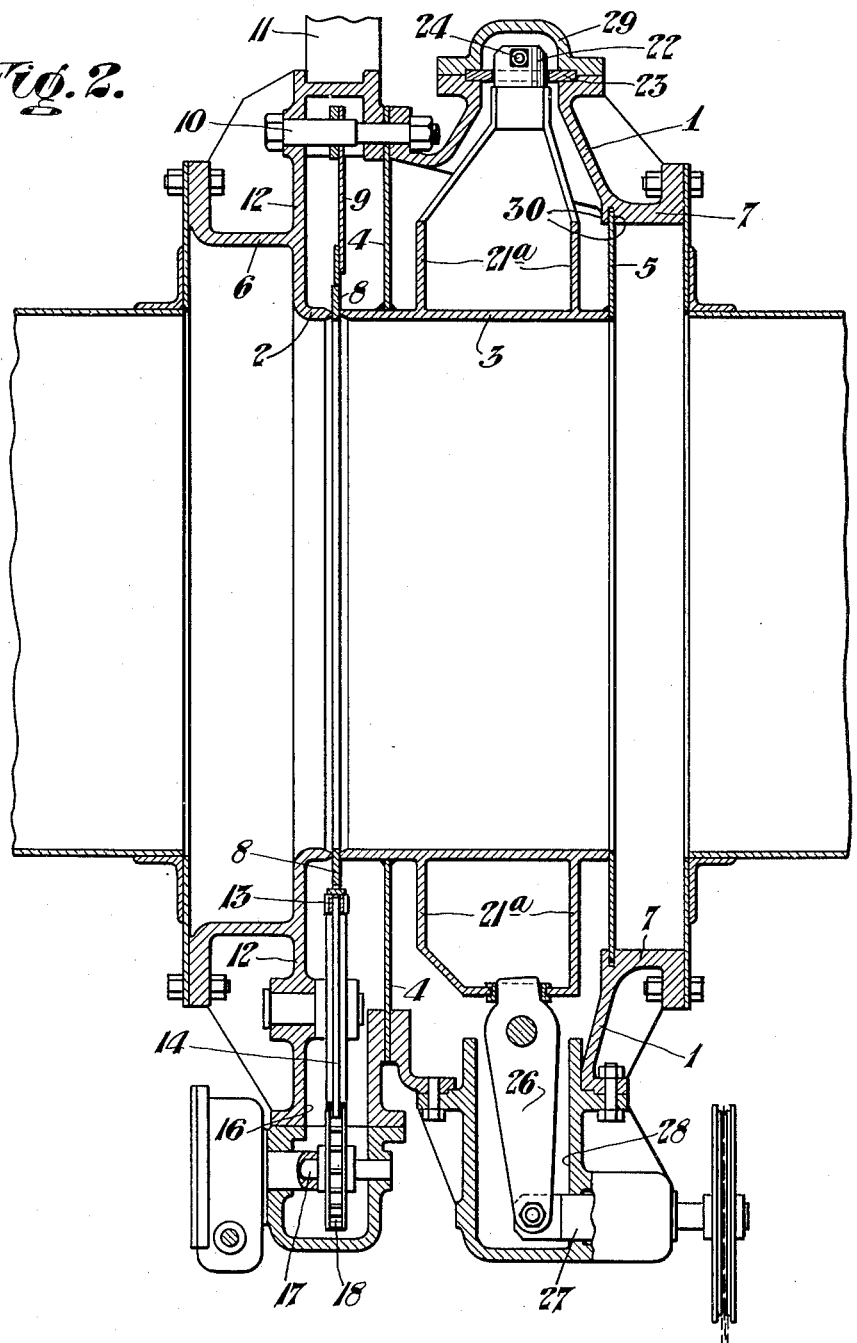

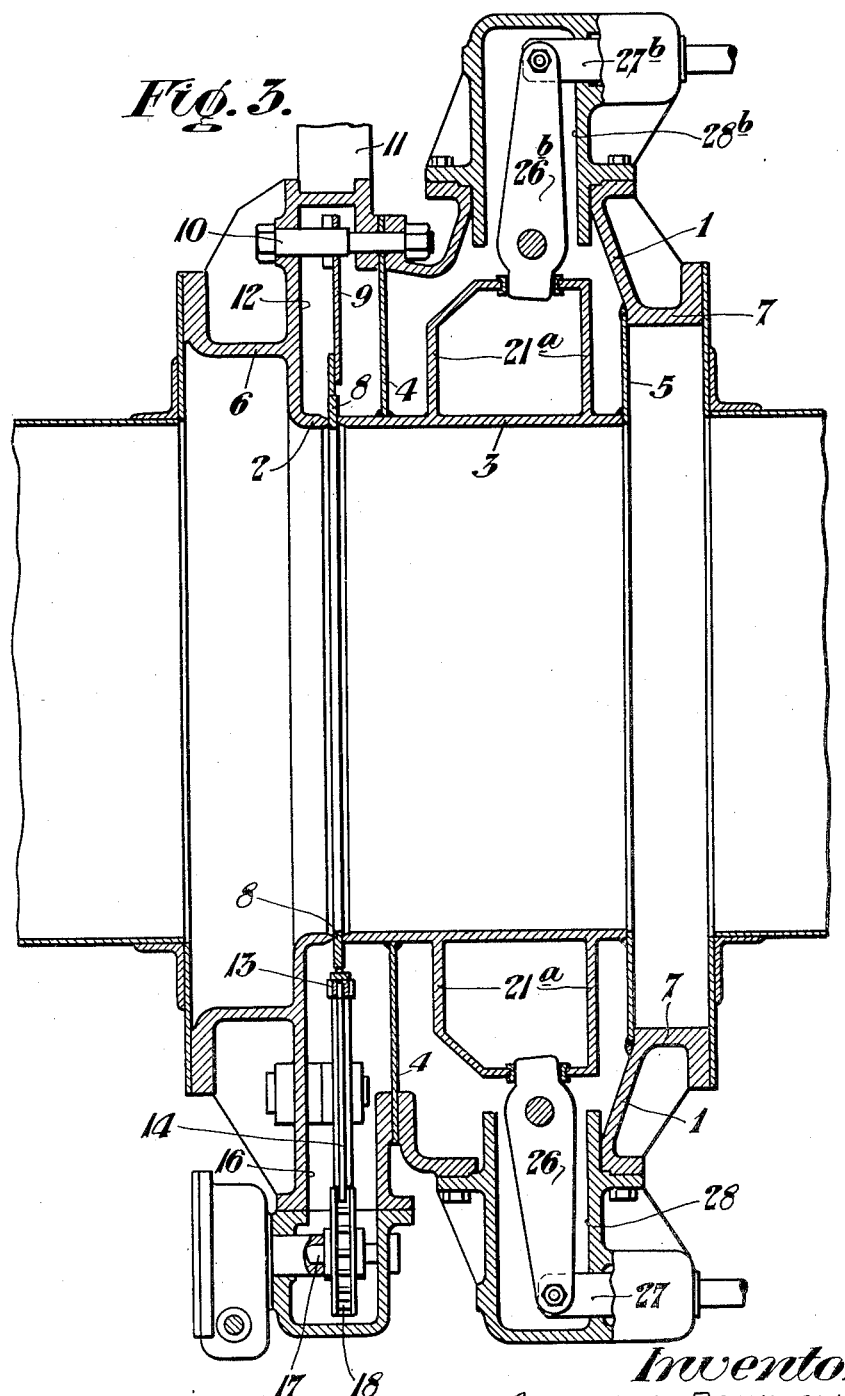

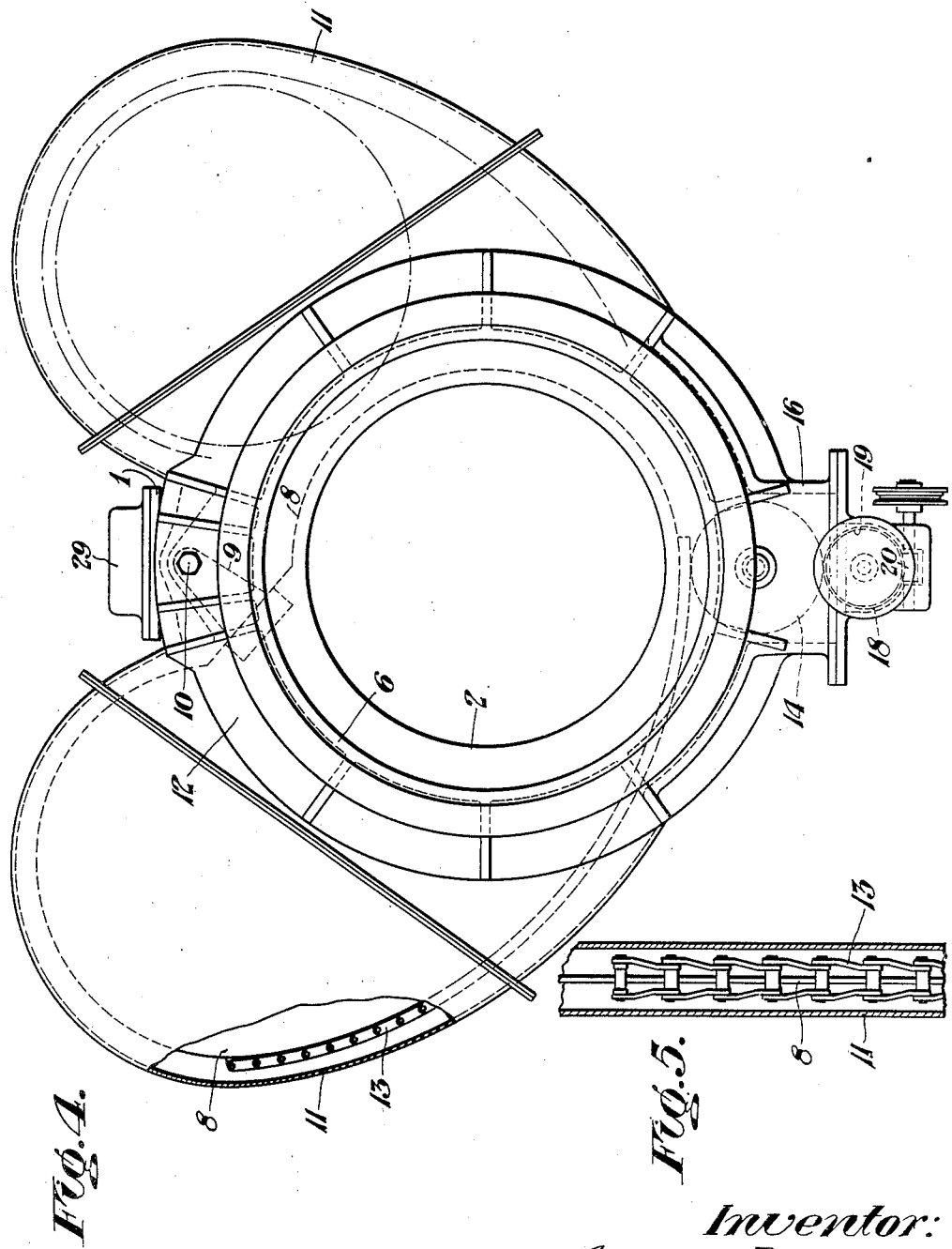

2,125,253

UNITED STATES PATENT OFFICE 2,125,253

FLUID VALVE

Andrew Bowland, Mount Lebanon, Pa., assignor to William M. Bailey Company, a corporation of Pennsylvania Application October 14, 1936, Serial No. 105,623

10 Claims. (Cl. 251—167)

This invention relates generally to fluid valves and is particularly concerned with valves adapted to handle large volumes of gases.

One type of valve particularly suited for this purpose consists, fundamentally speaking, of relatively reciprocative opposed gas conducting sections and a closing plate adapted to pass between the sections when they are separated from one another. The sections are capable of clamping this plate between each other in a substantially gas-tight manner.

The present invention is intended to provide a more efficient and durable valve of the above type and, particularly, to provide improved arrangements for reciprocating the reciprocative section and for moving the plate.

Several specific examples of valves embodying the invention are illustrated by the accompanying drawings. Figures 1, 2 and 3 are vertical sections of the various examples; Figure 4 is an end view of the valves shown by Figures 1 and 2; and Figure 5 is an enlargement of a detail.

In the first example, a casing 1 is constructed to provide the fixed gas conducting section 2, the reciprocative gas conducting section 3 being mounted by spaced diaphragms 4 and 5 in opposing relationship respecting this fixed section. These diaphragms are flexible and extend radially from the outside of the reciprocative section 3 to the inside of the casing 1. The sections 2 and 3 and the diaphragm 5 provide, in conjunction with flanged passages 6 and 7, a path for the gas flow to be controlled, the diaphragms 4 and 5 being welded peripherally to the outside of the section 3 and respectively clamped and welded in connection with the inside of the casing 1.

The plate 8 that passes between the sections 2 and 3 is in the form of a goggle-valve plate that is mounted through a centrally positioned arm 9 by a pivot 10 in the upper part of the casing. To permit passage of this plate between the sections it is necessary to separate the reciprocative section 3 from the fixed section 2. At such times, gas leakage may occur between the opposing edges of the two sections. Such leakage is prevented by completely enclosing the plate, this being done by providing wing-like enclosures or pockets 11 which extend from the casing 1 in line with the swing of the plate, and by an annular wall 12 that extends radially from the outside of section 2, the diaphragm 4 functioning in conjunction with this wall to complete the enclosure of the plate. It is to be understood that although the pockets 11 completely enclose, this may be done in such a manner as to permit opening for inspection, cleaning or repairs.

Movement of the goggle-valve plate 8 is accomplished by a chain 13 that is fixed to the edge of this plate opposite its pivoting point, this being the pivot 10, and which is curved with a radius about this point. The wall 12 of the casing 1 journals a sprocket 14 in a substantially gas-tight manner. This sprocket meshes with the chain 13, whereby its rotation effects swinging of the goggle-valve plate when the section 3 is separated from the section 2. A chain is used because it provides what is, in effect, a curved rack having openings in its teeth through which dirt may pass to prevent clogging. It is to be understood that the chain 13 is a piece of chain such as is ordinarily used to transmit rotary reciprocative power, and which has rollers that are engaged by the sprocket teeth.

The casing 1 provides a depending well or pocket 16 in which a shaft 17 is journaled, this shaft mounting a pinion 18 having teeth suitably designed for engagement with the sprocket 14. This shaft 17 is journaled by the well or pocket 16 in a substantially gas-tight manner and has a projecting end on which a gear 19 is mounted. A hand-powered worm 20 serves to rotate this gear 19 and, through the described gearing arrangement, swing the goggle-valve plate 8.

Since the reciprocative section 3 is mounted between two spaced diaphragms whose peripheries are rigidly fixed, it is desirable to impart linear movement to this section as contrasted to a swinging movement. To do this a large lever 21 is provided which is constructed as a structural unit that encircles the section 3. This lever has an upper cylindrical end 22 that is passed through a plate 23 and fixed by a pin 24. The hole in the plate 23 through which this end 22 passes is sufficiently oversize to permit the lever to swing the required extent.

Spaced pairs of diametrically opposite lugs 25 extend from the outsides of the section 3 and are engaged by the lever 21, these lugs being arranged substantially in a horizontal plane in line with the center-line of the two sections. It follows that reciprocation of the free end of this lever effects the linear movement desired to reciprocate the section 3. This reciprocation of the free end of the lever 21 is done by a two-armed lever 26 having a short arm that engages the bottom or free end of the lever 21 and a long arm that is reciprocated by a hand-powered screw device 27, this lever 26 and device 27 being mounted by an enclosing well or pocket 28 depending from the casing 1. Although not previously mentioned, the end 22 and plate 23 are also enclosed by a pocket 29 upstanding from the casing 1.

Upon reciprocation of the long end of the two-armed lever 26 by the screw device 27, the bottom end of the lever 21 is reciprocated so as to, in turn, reciprocate the section 3, whereby the goggle-valve plate 8 may be released so that it can be swung. The arrangement of the leverage system accomplishing this reciprocation is obviously such that very little friction is involved. Those parts that carry the greatest stresses involve simple bearing surfaces which have practically no sliding relation with one another. Furthermore, the arrangement is such that the reciprocative means is completely free from the direct flow of fluid conducted by the sections.

The universal mounting provided by the passage of the cylindrical end 22 of the lever through the plate 23 serves to permit the lever 21 to distribute stresses equally through the reciprocative section 3. This is an important feature in that it assures an absolutely equal stress distribution at all times and this, in turn, assures the clamping of the goggle-valve plate 8 between the sections 2 and 3 in a gas-tight manner. It is to be noted that even if these precautions fail to prevent some leakage between the sections, this leakage is confined within the casing.

The second example of the invention, shown by Figure 2, involves the same construction except for the leverage system reciprocating the gas conducting section, and for this reason the same numerals are again used.

The difference in the leverage system is that arms 21ª are welded directly to the reciprocative section 3 so that this section and these arms form a lever. The top one of the arms 21ª is illustrated as being mounted in the same manner, as was the case with the top end of the lever 21. Likewise, the bottom one of the arms 21ª is connected with the leverage system exactly like that shown in the case of the first example. For these reasons, similar numerals are used to indicate these parts. It is to be understood at this point that other reciprocating means can be used, and that the lever means provided by either construction may be pivoted at either their top or bottom ends. Various other changes may also be made without departing from the fundamentals involved.

Furthermore, it may be necessary to provide for some adjustment of the pivoting point of the end 22 unless very close manufacturing tolerances are maintained. Such an adjustment may be secured by making the hole in the plate 22 slightly off-center, and then rotating this plate as required.

In the case of this second example the reciprocative section 3 must travel in an arc about the pivoting point. Therefore, the outer periphery of the diaphragm 5 is in this case connected with the inside of the casing 1 so that a sliding action is possible. This is accomplished by a pair of annular flanges 30 between which the outer periphery of this diaphragm is arranged. Although this may not be completely gas-tight, it still functions to shield or separate the various parts from the direct flow of fluid through the fluid conducting sections and, of course, through the valve. Leakage between the two sections and the goggle-valve plate is still positively prevented, and any fluid that passes through the sliding connection of the outer periphery of the diaphragm 5 is prevented from reaching the outside by the previously described casing construction.

The third example, shown by Figure 3, also involves much of the construction initially described in the case of the first example, and here again similar numerals are used.

It is to be noted that the reciprocative gas and fluid conducting section 3 is provided with the arms 21ª illustrated in connection with the second example, the difference being that the diaphragm 5 is welded at its outside periphery to the inside of the casing 1, as was so in the case of the first example, whereby it is necessary to linearly move the reciprocative section 3. To provide this motion, the reciprocative means of the first example is used at the bottom and a duplicate of this means is provided for the top. This duplicate bears the same numerals as were used to describe the various parts in the first example, these numerals being followed by the letter b, to avoid confusion. The manner in which this duplicate is arranged for the reciprocation of the section 3 is apparent. It will be appreciated that the operating of the two reciprocating means must be synchronized to some extent at least. This, however, may be easily accomplished by the operator or, in case motorized means are used, by suitable mechanical or electrical arrangements. It is taken for granted that it will be appreciated that motorized devices may be substituted in all instances where manually powered devices are illustrated.

Although it has been said that the sections must be separated to permit the plate to swing, it is to be understood that these sections never actually contact. The plate being a goggle-valve plate, it provides blind and open eyes against the peripheries of which the sections clamp.

A further advantage provided by mounting the reciprocative section 3 through the diaphragms 2 and 5, as shown in Figures 1 and 3, is that this eliminates the need for projecting elements, such as shafts and the like, extending through the valve casing, whereby the weather and atmosphere are positively excluded from the valve's inside. Then, too, this mounting limits the movement of the reciprocative section to a truly linear motion, this forcing it to clamp evenly against the valve plate and assuring a more gas-tight joint than could possibly result should the reciprocative section move otherwise.

I claim:

1. A valve including a fixed fluid conducting section, a reciprocative fluid conducting section opposing said fixed section, a plate adapted to pass between said sections when said reciprocative section is separated from said fixed section, a lever constructed to encircle said reciprocative section and connecting with the latter, whereby reciprocation of said lever reciprocates said reciprocative section, and means for reciprocating said lever.

2. A valve including a fixed fluid conducting section, a reciprocative fluid conducting section opposing said fixed section, a plate adapted to pass between said sections when said reciprocative section is separated from said fixed section, a lever constructed to encircle said reciprocative section, lugs fixed diametrically opposite one another to the outside of said reciprocative section for engagement by said lever, means for mounting one end of said lever for universal pivoting motion, whereby reciprocation of the other end of said lever reciprocates said reciprocative section, and means for reciprocating said other end of said lever.

3. A valve including a fixed fluid conducting section, a reciprocative fluid conducting section opposing said fixed section, a plate adapted to pass between said sections when said reciprocative section is separated from said fixed section, lever means transversely associated with the outside of said reciprocative section, a two-armed lever having a short arm and a long arm, the end of said short arm connecting with an end of said lever means, and means for reciprocating said long arm of said two-armed lever.

4. A valve including a fixed fluid conducting section, a reciprocative fluid conducting section opposing said fixed section, a plate adapted to pass between said sections when said reciprocative section is separated from said fixed section, a lever constructed to encircle said reciprocative section and connecting with the latter, whereby reciprocation of said lever reciprocates said reciprocative section, and means for reciprocating said lever, said reciprocative section having spaced diaphragms extending outwardly from its periphery, said diaphragms being arranged on both sides of said lever and said reciprocating means so as to separate the same from the direct flow of fluid conducted by said sections.

5. A valve including a fixed fluid conducting section, a reciprocating fluid conducting section opposing said fixed section, a plate adapted to pass between said sections when said reciprocative section is separated from said fixed section, a lever constructed to encircle said reciprocative section, lugs fixed diametrically opposite one another to the outside of said reciprocative section for engagement by said lever, means for mounting one end of said lever for universal pivoting motion, whereby reciprocation of the other end of said lever reciprocates said reciprocative section, and means for reciprocating said other end of said lever, said reciprocative section having spaced diaphragms extending outwardly from its periphery, said diaphragms being arranged on both sides of said lever and said reciprocating means so as to separate the same from the direct flow of fluid conducted by said sections.

6. A valve including a fixed fluid conducting section, a reciprocative fluid conducting section opposing said fixed section, a plate adapted to pass between said sections when said reciprocative section is separated from said fixed section, lever means transversely associated with the outside of said reciprocative section, a two-armed lever having a short arm and a long arm, the end of said short arm connecting with an end of said lever means, and means for reciprocating said long arm of said two-armed lever, said reciprocative section having spaced diaphragms extending outwardly from its periphery, said diaphragms being arranged on both sides of said lever and said reciprocating means so as to separate the same from the direct flow of fluid conducted by said sections.

7. A valve including a fixed fluid conducting section, a reciprocative fluid conducting section, a plate adapted to pass between said sections when said reciprocative section is separated from said fixed section, arms extending from the outside of said reciprocative section and means for reciprocating said reciprocative section through said arms, said valve having a casing in which said sections are arranged and which mounts said means, and said reciprocative section having spaced diaphragms extending outwardly from the outside of the same to the inside of said casing, said arms being arranged between said diaphragms.

8. A valve comprising a casing, a fixed fluid conducting section in said casing, a reciprocative fluid conducting section, spaced diaphragms extending from the outside of said reciprocative section to the inside of said casing and mounting said reciprocative section in opposed relationship with said fixed section, a goggle-valve plate pivoted to swing between said sections when said reciprocative section is separated from said fixed section, a rack fixed to the edge of said plate opposite its pivoting point and curved with a radius about said point, a gear meshing with said rack, whereby rotation of said gear swings said plate, said rack having openings between its teeth through which dirt may pass to prevent clogging, and said casing having oppositely extending portions in which said plate may swing, lever means transversely associated with the outside of said reciprocative section between said diaphragms, and means for reciprocating said reciprocative section through said lever means.

9. A valve comprising a casing, a fixed fluid conducting section in said casing, a reciprocative fluid conducting section, spaced diaphragms extending from the outside of said reciprocative section to the inside of said casing and mounting said reciprocative section in opposed relationship with said fixed section, a goggle-valve plate pivoted to swing between said sections when said reciprocative section is separated from said fixed section, a rack fixed to the edge of said plate opposite its pivoting point and curved with a radius about said point, a gear meshing with said rack, whereby rotation of said gear swings said plate, said rack having openings between its teeth through which dirt may pass to prevent clogging, and said casing having oppositely extending portions in which said plate may swing, arms extending laterally from the outside of said reciprocative section and means for reciprocating said section through said arms.

10. A valve comprising a casing, a fixed fluid conducting section in said casing, a reciprocative fluid conducting section, spaced flexible diaphragms extending from the outside of said reciprocative section to the inside of said casing and mounting said reciprocative section in opposed relationship with said fixed section, a goggle-valve plate pivoted to swing between said sections when said reciprocative section is separated from said fixed section, means for swinging said plate and means associated with the outside of said reciprocative section between said diaphragms for reciprocating said reciprocative section, said flexible diaphragms functioning to limit the movement of said reciprocative section to a straight line and to constantly hold the same concentric with said fixed section.

ANDREW BOWLAND.